March 18, 1941. P. B. REEVES 2,235,333
VARIABLE SPEED DRIVE
Filed Nov. 17, 1939
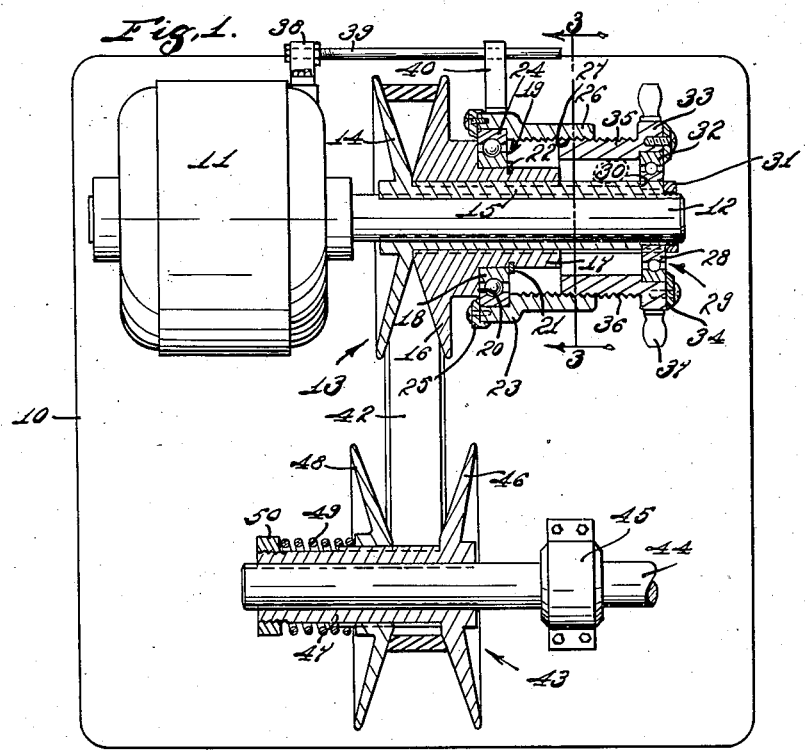
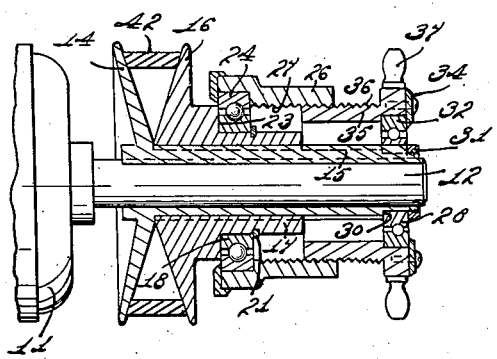
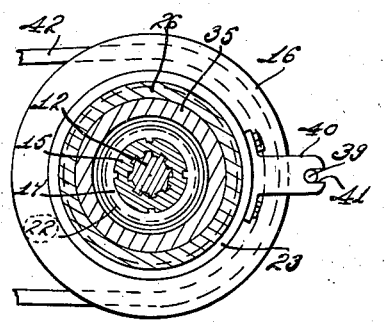
INVENTOR.
Paul B. Reeves,
BY
Hood & Hahn.
ATTORNEYS.

Patented Mar. 18, 1941

2,235,333

UNITED STATES PATENT OFFICE 2,235,333

VARIABLE SPEED DRIVE

Paul B. Reeves, Columbus, Ind., assignor to Reeves Pulley Company, Columbus, Ind., a corporation of Indiana Application November 17, 1939, Serial No. 304,898

2 Claims. (Cl. 74—230.17)

The present specification relates to variable speed drives, and more particularly to drives generally of the character illustrated in my prior Patent No. 2,089,711 and my co-pending application Ser. No. 266,978, filed April 10, 1939. The primary object of the invention is to provide novel and simple means for axially shifting one disc of a pair cooperating to form a V-pulley of variable diameter, to vary the speed at which a cooperating V-pulley will be driven by a belt running over the first-named pulley. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan view of a variable speed drive incorporating the shifting mechanism of the present invention, parts being shown in section for clarity of illustration;

Fig. 2 is a vertical section through the driving unit of the organization; and

Fig. 3 is a transverse section substantially on the line 3—3 of Fig. 1.

Referring more particularly to the drawing, it will be seen that I have illustrated a base 10 upon which is supported a motor 11 having a spindle 12. Mounted upon the spindle 12 is an expansible V-pulley indicated generally by the reference numeral 13 and comprising a coned disc 14 fixed to the spindle 12 and having an elongated hub 15 projecting axially from its coned face, and a mating coned disc 16 slidably mounted upon the hub 15. Said disc 16 is formed with an axial hub 17 projecting away from the rear face thereof.

The inner race 18 of a friction-reducing bearing indicated generally by the reference numeral 19, is mounted upon the hub 17 and bears against an outwardly facing shoulder 20 formed on said hub, said bearing being held against axial movement with respect to the hub 17 by a spring ring 21 seated in a peripheral groove 22 formed in the hub 17.

A bearing housing 23 is formed to receive the outer race 24 of the bearing 19, said outer race being held against axial movement with respect to the bearing housing by engagement between a shoulder formed within the bearing housing and a holder ring 25 secured to the end of the bearing housing. The bearing housing is formed with an axially projecting sleeve 26 which is internally threaded as at 27.

The inner race 28 of a friction-reducing bearing indicated generally by the reference numeral 29, is received upon the remote end of the hub 15, bearing against an outwardly facing shoulder 30 formed on said hub and held against axial movement with respect to the hub 15 by a nut 31 or other suitable fastening means. The outer race 32 of the bearing 29 is received within a bearing housing 33, abutting an outwardly facing shoulder in said housing and held in place by a ring 34 suitably secured to the outer face of said housing 33. The housing 33 is formed with an axially extending sleeve 35 which is externally threaded as at 36 for threaded cooperation with the threaded portion 27 of the sleeve 26. The bearing housing 33 may preferably be formed with spokes 37 or the like to facilitate manual rotation thereof; and any desired means may be provided for holding said housing 33 against accidental rotation.

A bracket 38 mounted upon the motor 11, carries a rod 39 projecting in substantial parallelism to the spindle 12. An arm 40, suitably secured to the bearing housing 23, is bifurcated as at 41 to embrace slidably the rod 39, whereby said bearing housing 23 is held against rotation while being free to move axially. It will be seen that the bearing housing 33, on the other hand, is held, through the bearing 29, against reciprocation with respect to the hub 15, while being free to rotate about its own axis. Obviously, the described arrangement constitutes motion-converting means whereby rotation of the housing 33 will be converted into axial movement of the housing 23. Since the bearing race 24 is fixed axially with respect to the housing 23 and the bearing race 18 is fixed axially with respect to the hub 17, it will be obvious that rotation of the housing 33 in opposite directions will result in positive adjustment of the disc 16 axially in opposite directions.

An edge active belt 42 is received between the discs 14 and 16 and drives to a resiliently expansible V-pulley indicated generally by the reference numeral 43, said pulley being mounted upon a shaft 44 which is shown as supported in a suitable bearing 45 upstanding from the base 10. The pulley 43 comprises a coned disc 46 fixed to the shaft 44 and provided with an axially extending hub 47 projecting from its coned face. A mating coned disc 48 is slidably mounted upon the hub 47 and is constantly urged toward the disc 46 by a spring 49 abutting said disc 48 and a stop nut 50 suitably secured to the remote end of the hub 47.

Obviously, as the disc 16 is backed away from the disc 14, the belt 42 will be permitted to move inwardly in the groove between said discs, under the influence of the spring 49 which constantly tends to urge the disc 48 toward the disc 46, thereby squeezing the belt 42 outwardly between said discs. The result of such adjustment will be to reduce the speed of the shaft 44. As obviously, rotation of the housing 33 in the opposite direction will shift the disc 16 toward the disc 14 to increase the output speed of the shaft 44.

I claim as my invention:

1. An adjustable V-pulley comprising a coned disc having an elongated hub projecting from its coned face, a mating coned disc axially slidably mounted on said hub and having a hub projecting from its outer face, an anti-friction bearing comprising two coplanar, concentric races and a series of anti-friction elements confined therebetween, the inner race of said bearing being fixed to the hub of said first-mentioned disc beyond the hub of said second-mentioned disc, a housing for said bearing fixedly associated with the outer race of said bearing and including an externally-threaded axially-extending sleeve projecting toward said discs, a second anti-friction bearing comprising two coplanar, concentric races and a series of anti-fricton elements confined therebetween, the inner race of said second bearing being fixed to the hub of said second-mentioned disc, a housing for said second bearing fixedly associated with the outer race of said second bearing and including an internally-threaded axially-extending sleeve projecting away from said discs and threadedly associated with the sleeve of said first-mentioned housing, and means holding said housing for said second bearing against rotation.

2. For use with a motor having a spindle, an adjustable V-pulley comprising a coned disc fixed on said spindle and having an elongated hub projecting from its coned face away from said motor, a mating coned disc axially slidably mounted on said hub and having a hub projecting from its outer face, an anti-friction bearing comprising two coplanar, concentric races and a series of anti-friction elements confined therebetween, the inner race of said bearing being fixed to the hub of said first-mentioned disc beyond the hub of said second-mentioned disc, a housing for said bearing fixedly associated with the outer race of said bearing and including an externally-threaded axially-extending sleeve projecting toward said discs, a second anti-friction bearing comprising two coplanar, concentric races and a series of anti-friction elements confined therebetween, the inner race of said second bearing being fixed to the hub of said second-mentioned disc, a housing for said second bearing fixedly associated with the outer race of said second bearing and including an internally-threaded axially-extending sleeve projecting away from said discs and threadedly associated with the sleeve of said first-mentioned housing, an arm carried by said motor and projecting therefrom in parallelism with said spindle, and a perforated post radially extending from the housing for said second bearing and slidably receiving said arm.

PAUL B. REEVES.